United States Patent [19]

Piety

[11] Patent Number: 5,744,723

[45] Date of Patent: Apr. 28, 1998

[54] METHOD FOR DETERMINING ROTATIONAL SPEED FROM MACHINE VIBRATION DATA

[75] Inventor: Kenneth R. Piety, Knoxville, Tenn.

[73] Assignee: CSI Technology, Inc., Wilmington, Del.

[21] Appl. No.: 644,176

[22] Filed: May 10, 1996

[51] Int. Cl.⁶ .................................................. G01N 29/00
[52] U.S. Cl. .............................. 73/660; 73/659; 364/508
[58] Field of Search ............................ 73/660, 650, 658, 73/659, 602; 364/485, 508, 551.02

[56] References Cited

U.S. PATENT DOCUMENTS

| | | | |
|---|---|---|---|
| 3,885,420 | 5/1975 | Wolfinger | 73/650 |
| 4,136,312 | 1/1979 | Salon et al. | 324/51 |
| 4,423,635 | 1/1984 | Senicourt et al. | 73/660 |
| 4,429,578 | 2/1984 | Darrel et al. | 73/659 |
| 4,761,703 | 8/1988 | Kliman et al. | 361/23 |
| 4,808,932 | 2/1989 | Schulz, Jr. et al. | 324/525 |
| 4,896,537 | 1/1990 | Osborne | 73/660 |
| 5,115,671 | 5/1992 | Hicho | 73/660 |
| 5,252,915 | 10/1993 | Sedding et al. | 324/158 |
| 5,365,787 | 11/1994 | Hernandez et al. | 73/660 |

OTHER PUBLICATIONS

Tracor Applied Sciences, Functional Specification and System Design for Automated Machinery Vibration Analysis and Message Generation System, Oct. 12, 1990, §§0.0–1.4, 4.0–4.1.3.

Melvin J. Hinich, Detecting a Hidden Periodic Signal When Its Period is Unknown, IEEE Transactions on Acoustics, Speech, and Signal Processing, vol. ASSP–30, No. 5, Oct. 1982, pp. 747–750.

*Primary Examiner*—Christine K. Oda
*Attorney, Agent, or Firm*—Luedeka, Neely & Graham, P.C.

[57] ABSTRACT

A method of determining the rotational speed of a rotating shaft from machine vibration data. The vibration produced by the shaft is sensed to produce a test vibration signal at an unknown rotational speed of the shaft, which test vibrational signal is converted to a test frequency spectrum. A reference frequency spectrum, corresponding to a known rotational speed of the shaft, is provided, and a stretch factor is determined. The stretch factor provides optimum correlation between the test frequency spectrum and the reference frequency spectrum. The unknown speed of the rotating shaft is calculated using the known speed of the reference frequency spectrum and the stretch factor.

37 Claims, 2 Drawing Sheets

METHOD FOR DETERMINING ROTATIONAL SPEED FROM MACHINE VIBRATION DATA

AREA OF THE INVENTION

This invention relates to the measurement of rotational speed, and more particularly to the measurement of rotational speed using vibration analysis. An appendix of source code implementing various aspects of a method according to the invention is incorporated herein by reference.

BACKGROUND OF THE INVENTION

Rotating equipment, such as fans, motors, turbines, and the like, tend to lose their balance or alignment with time due to conditions such as wear, varying load, misuse, and foreign matter accumulation. As balance and alignment are lost, the equipment produces excessive vibration, which if left uncorrected, causes accelerated wear and other damage to the equipment.

Vibration analyzers detect the vibration emitted from rotating equipment. Such analyzers determine the source of the vibration, whether it be unbalance, misalignment, worn bearings, or some other problem. To make a proper diagnosis of the vibration problem, the rotational speed of the shaft is measured, and correlated with a vibration spectrum.

Correlation of the rotational speed of the shaft with the vibration spectrum is usually required for problem diagnosis because there are often many different potential sources of vibration, each of which creates a different vibration signature. One of the first determinations to be made is whether the vibration detected is synchronous or asynchronous with the rotation of the equipment. If asynchronous, an analysis is made to determine if the vibration can be correlated in some other way to the rotational speed of the equipment. In this manner, specific problems are isolated and corrected.

For example, in a piece of rotary equipment such as a turbine, vibration that is synchronous with the first harmonic of the rotation speed indicates rotor unbalance, for which there are well defined methods of correction. Knowing the rotational speed of the turbine allows for a speedy diagnosis of this problem, and reduces time wasted on investigation of unrelated potential vibration sources.

As another example, a defective anti-friction bearing produces vibration that has a fixed, but non-integer relationship to the speed of the shaft. Thus it is not a harmonic of the rotational speed of shaft. However, with a knowledge of the bearing parameters, such as the number of balls in the bearing, the vibration produced by the defective bearing is correlated with the speed of the shaft, and the problem is diagnosed and corrected. Again, without knowledge of the speed of the shaft, the defective bearing is more difficult to diagnose.

Further, in a piece of rotary equipment such as a gear box, which may have several gears of different sizes, a problem such as a cracked tooth on one of the gears creates vibration that is synchronous with the rotational speed of a shaft. Correlating the speed of rotation, the known number of teeth on each gear, and the vibration spectrum allows the damaged gear to be diagnosed.

In each case, the diagnosis of the source of vibration is made easier by knowing the speed of rotation. The actual correlation of the rotational speed to the vibration spectrum, and the analysis of the correlated information, is performed either by the technician, or automatically by the vibration detection instrument, if it has such capability.

Measuring the speed of the rotor has traditionally required specialized instruments in addition to those used for the analysis of the vibration. Such specialized instruments include, for example, a photo tachometer which detects rotational speed by sensing reflected light pulses from a piece of reflective tape mounted on a spinning rotor.

The need for additional instruments lengthens the time required to perform the vibration analysis, by requiring extra set-up time. Additionally, to continue the example above, procedures such as attaching the reflective tape to a rotor require that the rotor be taken out of service. Additional space is required to transport and set up the speed measurement instrument, and additional power is also required. The additional space and power requirements are substantial burdens to overcome when analyzing remotely located rotating equipment or large populations of such equipment.

What is needed, therefore, is a method for accurately measuring rotational speed with a minimal amount of instrumentation.

SUMMARY OF THE INVENTION

The above and other needs are met by a method of determining the rotational speed of a rotating shaft from machine vibration data. The vibration produced by the shaft is sensed to produce a test vibration signal at an unknown rotational speed of the shaft, which test vibrational signal is converted to a test frequency spectrum, and a table of peaks found in the test frequency spectrum is compiled. A reference frequency spectrum, corresponding to a known rotational speed of the shaft, is provided, and a table of peaks found in the reference frequency spectrum is compiled. An optimum stretch factor is determined, which provides optimum correlation between the test frequency spectrum peaks and the reference frequency spectrum peaks. The unknown speed of the rotating shaft is calculated using the known speed of the reference frequency spectrum and the optimum stretch factor.

As hereinafter discussed in more detail, optimum correlation is preferably calculated by normalizing the amplitudes of the peaks of both spectra, and calculating correlations based on the two tables of normalized peak amplitudes and frequencies.

The correlation of the tables of peaks offers several advantages over the simple line by line correlation of the spectra. First, it is more efficient since less elements must be correlated. Second, it is more accurate because the peak amplitudes and frequencies more precisely identify the significant features in the spectra. Third, it allows the correlation of spectra which are calculated under very different conditions, such as lines of resolution or the maximum frequency.

In a preferred embodiment, a flag is provided which indicates whether the rotational speed of the shaft has already been determined. If the flag indicates that the rotational speed of the shaft has already been determined, then the flag also indicates how the rotational speed of the shaft was determined. The remaining steps of the method are selectively by-passed based on the flag.

The preferred step of determining an optimum stretch factor further includes partitioning the test frequency spectrum into a predetermined number of partitions, and independently identifying the frequency and amplitude of peaks in each partition of the test frequency spectrum. The amplitude of the peaks of the test frequency spectrum are normalized, and a test table of frequencies and normalized amplitudes for a predetermined number of the largest peaks identified in each partition of the test frequency spectrum is compiled.

In like manner, the reference frequency spectrum is also partitioned into a predetermined number of partitions, and peaks having frequency and amplitude are independently identified in each partition of the reference frequency spectrum. The amplitude of the peaks of the reference frequency spectrum are normalized, and a reference table of frequencies and normalized amplitudes for a predetermined number of the largest peaks identified in each partition of the reference frequency spectrum is compiled.

In the preferred embodiment, the step of determining an optimum stretch factor starts by determining a beginning trial stretch factor and an ending trial stretch factor. The frequencies of the test table are multiplied by the beginning trial stretch factor, and a correlation index between the reference table and the test table, as multiplied by the beginning trial stretch factor, is determined and stored. Next, an incremental amount is added to the beginning stretch factor to calculate a new trial stretch factor and using the new trial stretch factor, another correlation index is determined and stored. Thereafter, the incremental amount is added to the new trial stretch factor to produce another new trial stretch factor, and yet another correlation index is determined and stored.

This process of increasing the size of the new trial stretch factor, and determining and storing a new correlation index, is repeated until the ending trial stretch factor is reached. Out of the set of correlation indexes that were determined and stored, the largest is selected, and the stretch factor corresponding to the largest correlation index is considered the best stretch factor.

The stretch factor that preceded the best stretch factor is then selected as a new beginning trial stretch factor and the stretch factor the immediately followed the best stretch factor is selected as a new ending trial stretch factor. The process described above is repeated using the new beginning and ending stretch factors to determine a new best stretch factor.

Using the new best stretch factor, new beginning and ending stretch factors are again selected in the same manner as described above, and yet another best stretch factor is determined. As many iterations as desired are performed, and the last best stretch factor is designated and used as the optimum stretch factor.

In a most preferred embodiment, the predetermined number of test frequency spectrum partitions is equal to the predetermined number of reference frequency spectrum partitions, and the partitions are all the same size.

The peaks of the test frequency spectrum are preferably normalized according to the following method. The largest peak in the test frequency spectrum table of peaks is located and designated as PKHI, and the smallest peak in the test frequency spectrum table of peaks is located and designated as PKLO. A normalized value of each peak, designated as PKX, is calculated using the amplitude of the peak, designated as PKV, according to the equation:

$$PKX = 5 \times \frac{20 \times \log \frac{PKV}{PKLO}}{20 \times \log \frac{PKHI}{PKLO}} + 1$$

Further, in the preferred embodiment, the flag indicates whether the rotational speed of the shaft was determined by one of a plurality of methods including calculated by an algorithm based on a test frequency spectrum, directly measured such as with a tachometer, and manually set by the technician based on any criteria the technician chooses to use. The remaining steps of the method may be selectively performed regardless of the flag.

The correlation index is most preferably determined by multiplying a smaller of a frequency resolution of the test table and a frequency resolution of the reference table by a factor, which product is designated as DFRQ. A positive difference in frequency, designated as FDEL, between each peak of the test table which can be matched to a peak of the reference table which is at most a frequency distance of DFRQ away, is also determined.

If there is no peak of the reference table which is within this frequency distance from the peak of the test table, then it is considered that there is no match for the peak of the test table. The normalized amplitudes of the test table peaks are designated as PKXT and the normalized amplitudes of the reference table peaks are designated as PKXR. The correlation index is calculated according to the equation:

$$\frac{\sum_{\text{Matches}}^{\text{All}} \left[ (PKX_T * PKX_R) \left( 1 - \frac{FDEL}{DFRQ} \right) \right]}{2.5 * \sum_{\text{Peaks}}^{\text{All}} PKX_T}$$

BRIEF DESCRIPTION OF THE DRAWINGS

The present invention may best be understood by reference to a detailed description of preferred embodiments when considered in conjunction with the following drawings, in which.

DETAILED DESCRIPTION OF THE INVENTION

Vibration analyzers, such as the CSI 2115 or the CSI 2120, are useful to sense, analyze, and record vibration in rotating equipment, which vibration can, if left uncorrected, degrade the efficiency of, or even destroy the rotating equipment. Preferably, an analyzer such as the CSI 2115 is used to collect and analyze vibration data, which is also stored and uploaded to a base computer for further analysis. Typically, the method of the present invention is performed primarily in the base computer, but it could also be performed in a suitably programmed analyzer of sufficient computing ability. To determine the source of the vibration, the sensed vibration frequency signal is normally referenced to the rotational speed of the equipment producing the vibration. With this speed reference, and knowledge of other rotor specifications, the source of the vibration is accurately determined.

The instrument used to sense the vibration produced by the shaft produces a vibration signal. If the rotational speed of the shaft is unknown, then the signal may be termed a test vibrational signal. If the rotational speed of the shaft is known, then the signal may be termed a reference vibrational signal. The vibration signal, whether it be a test signal or a reference signal, is converted into a frequency spectrum using any of the known methods.

Figure 1:
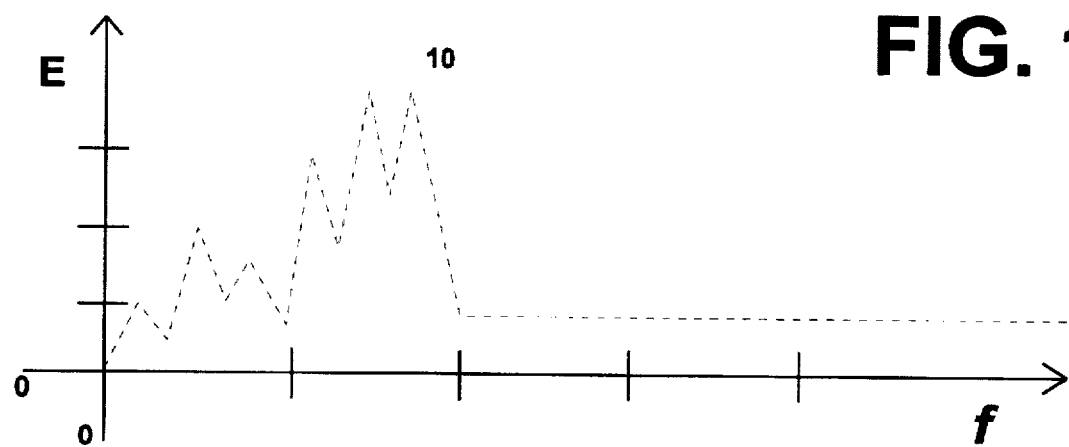
FIG. 1 is a graph of peaks taken from a frequency domain test spectrum.

Referring now to the drawings in which like reference characters designate like or corresponding parts throughout the several views, there is shown in FIG. 1 a frequency graph 10, representing vibration energy peaks sensed from a rotor. The graph of FIG. 1 was created by first measuring a time domain analog signal representing vibration. The time domain analog signal is converted to a frequency domain spectrum, preferably by fast fourier transform, and peaks of the spectrum are selected and plotted. Each point plotted in FIG. 1 represents a selected peak of the spectrum. As depicted, graph 10 is greatly simplified, but this simplification is used so as to not unnecessarily complicate the explanation of the method of the invention.

In FIG. 1, the ordinal axis represents frequency, increasing from a value of zero at the origin, through first, second, third, and fourth arbitrary values as represented by tick marks on the axis. The abscissal axis represents amplitude, and increases from a value of zero at the origin, through first, second, and third arbitrary values as represented by tick marks on the axis.

Each peak plotted in FIG. 1 has associated with it an amplitude (ie., acceleration, velocity, or displacement), or in other words, the energy present in the movement of the rotating equipment occurring at that specific frequency.

In the preferred method of the invention, a determination is made as to whether the rotational speed is already known, or if it needs to be determined. This is done with the use of an indicator, or data flag in the data representing the test spectrum, which is given a different value depending on whether the rotational speed is already known, and if so, how the speed was determined. For example, the data flag could be given a value of zero if the rotational speed is unknown, a value of one if the rotational speed has been input manually by the technician, a value of two if the rotational speed was measured by a tachometer or other direct speed measurement device, and a value of three if the rotational speed has been previously calculated from the test spectrum itself, such as by the method of the invention as detailed below, or by any other method of determining rotational speed based on a test spectrum.

If the rotational speed has already been determined, then no further processing to determine the speed of the rotating shaft is required, and the remaining steps of the method may be selectively by-passed. However, in the preferred embodiment, even when the speed is known, the information concerning the speed and how it was determined is output, and an opportunity is given to selectively proceed with the speed determination method, based on which of the methods was used to determine the speed of the shaft, as indicated by the data flag, or regardless of the data flag. For example, a technician may set control flags in the field instrument or base computer (wherever the method is implemented) causing the method to terminate or proceed based on any desired combination of the data flags indicating whether and how rotational speed was previously determined.

Figure 2:
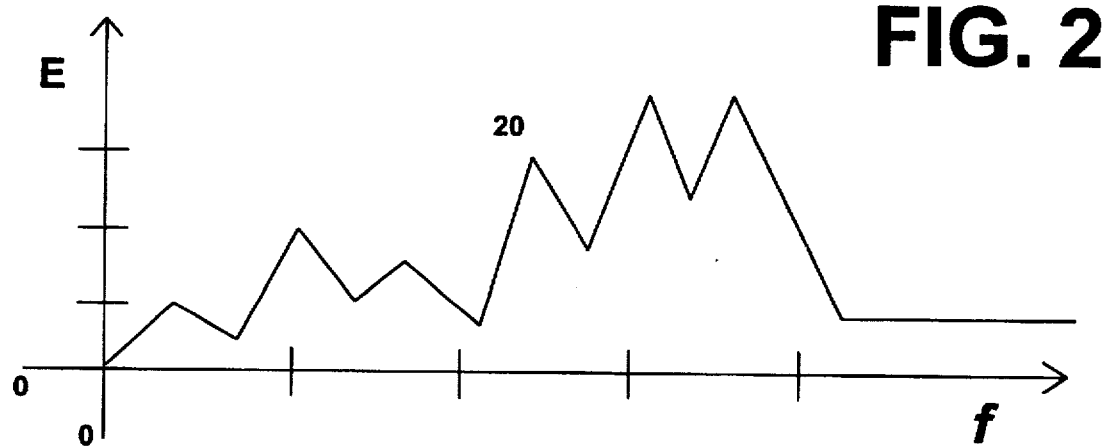
FIG. 2 is a graph of peaks taken from a frequency domain reference spectrum.

In FIG. 2 there is depicted a reference graph 20 for the rotating equipment from which graph 10 was measured. Graph 20 was created in the same manner as graph 10, but an important difference between test graph 10 and reference graph 20 is that the rotational speed of the equipment, during the time which graph 20 was acquired, is known. The rotational speed of the equipment is not known for the period of time during which test graph 10 was acquired.

Figure 3:
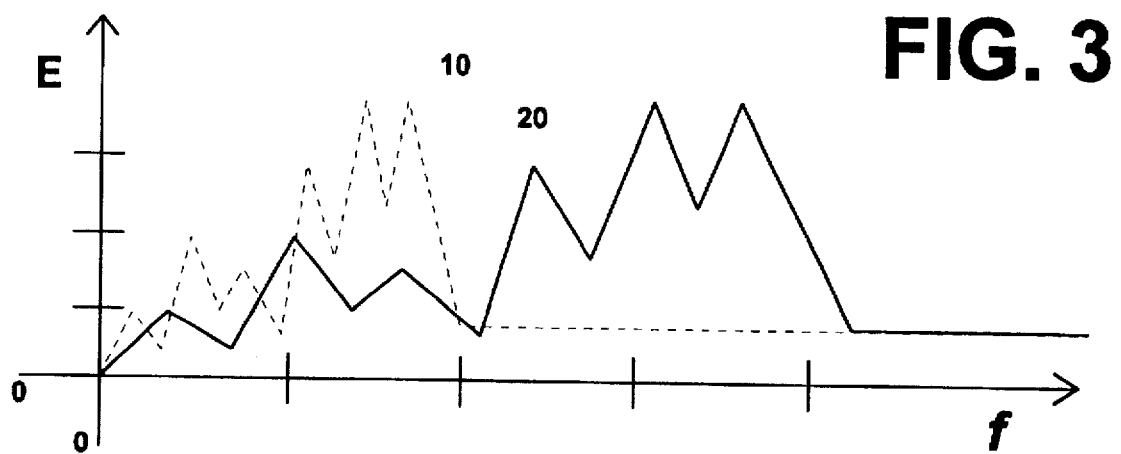
FIG. 3 is the graph of FIG. 1 overlaid with the graph of FIG. 2.

The test graph 10 and the reference graph 20 are compared in a manner that allows the speed of the test graph 10 to be correlated to the speed of the reference graph 20, such as is graphically depicted in FIG. 3. In actual implementation, the graphs are not graphically superimposed on one another, but instead a table of numbers representing the graphs 10 and 20 are mathematically compared one to another. However, for the purpose of an overview of the method, the graphical comparison process clarifies the method of the invention.

Figure 4:
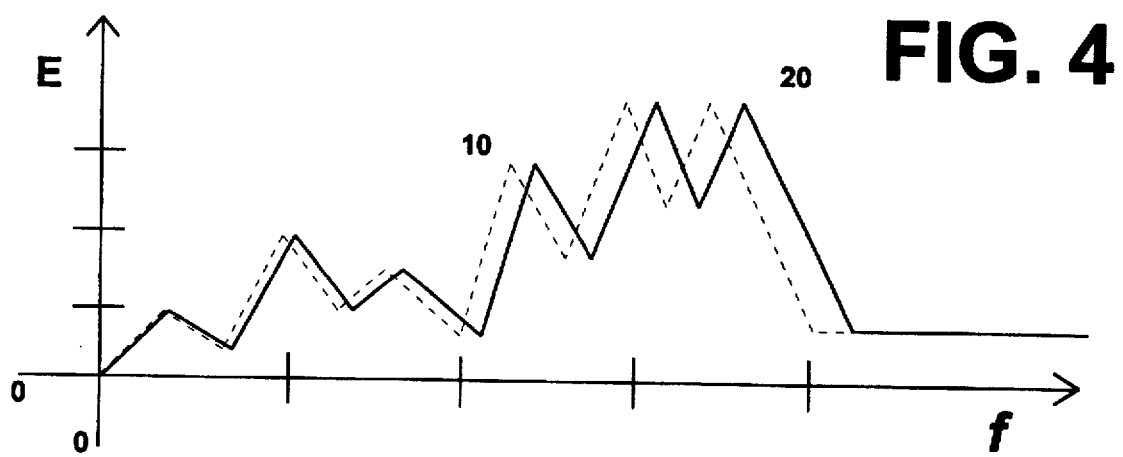
FIG. 4 is similar to FIG. 3, showing the graph of FIG. 1 multiplied by a stretch factor.

The test graph 10 is multiplied by a stretch factor. The multiplication of the test graph 10 by the stretch factor produces an adjusted graph that can be depicted as an elongated version of the original graph. In FIG. 4 there is depicted the reference graph 20 overlaid with the test graph 10, which has been multiplied by a value of two. As can be seen by comparing FIG. 3 to FIG. 4, the test graph 10 as multiplied by the stretch factor, and depicted in FIG. 4, is elongated as compared to the unmodified test graph 10 as depicted in FIG. 3.

It can also be seen that the test graph 10 as depicted in FIG. 4 more closely matches the reference graph 20. The magnitude of the stretch factor is adjusted as necessary to determine that stretch factor which provides optimum correlation between the test graph 10 and the reference graph 20. The degree of correlation between the test graph 10 and the reference graph 20 is measured with a correlation index which increases in value as the degree of correlation increases.

Figure 5:
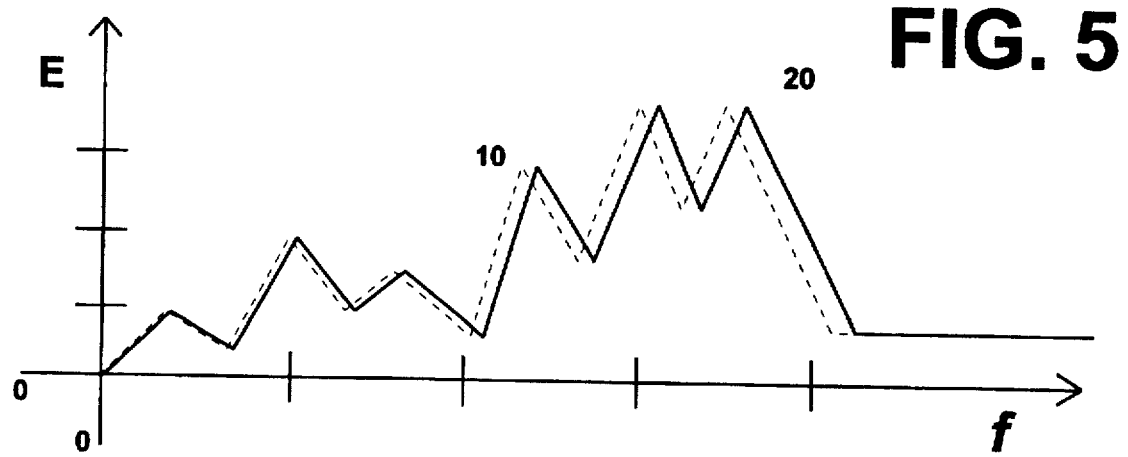
FIG. 5 is similar to FIG. 4, showing the graph of FIG. 1 multiplied by another stretch factor.

FIG. 5 depicts the test graph 10 of FIG. 3 as multiplied by another stretch factor. It can be seen that the test graph 10 as multiplied by this stretch factor more closely matches the reference graph 20, but they are not yet in perfect alignment. The process of adjusting the stretch factor and determining the degree of correlation with a correlation index is iteratively repeated until an optimum stretch factor is determined, and the unknown speed of the rotating shaft is calculated by dividing the known speed of the reference frequency graph by the optimum stretch factor.

It should be understood that the object of correlating the graphs 10 and 20 is to find an optimum stretch factor that best correlates the test spectrum peaks and the reference spectrum peaks. The preferred embodiments are described below in more detail.

Before the step of calculating a correlation index, the reference frequency spectrum is divided into frequency partitions, and peaks within the reference frequency spectrum are independently located within each of the partitions. In this manner, many large peaks located within one partition do not inhibit finding peaks within another partition. Thus, an energy mound in one portion of the spectrum, for example, located within one partition, will not inhibit finding peaks in other portions of the spectrum, located within other partitions.

The step of partitioning is also accomplished on the test frequency spectrum. In a most preferred embodiment, there are three partitions of equal size in each of the test frequency spectrum and the reference frequency spectrum. However, this number, as with all other specific numbers herein, is given for convenience only, and in other embodiments there may be two or more partitions in each spectrum and the partitions may be of differing sizes.

Once the spectra have been partitioned, peaks are independently located within each partition. Any method may be used to locate the peaks. However, the peaks are more accurately located by interpolation, summation, or fitting techniques, to give more precise values for peak amplitude and frequency. The frequency and amplitude of the peaks are more accurate than the simple identification of the largest lines in the spectrum. These peak values are largely invariant regardless of how the fast fourier transform is calculated with respect to lines of resolution and the maximum frequency. As the peaks are located, information as to the frequency location and the amplitude of each peak is recorded in a table.

Peaks corresponding to a multiple of the electrical line frequency at which the motor driving the rotating shaft is operating are preferably removed. For example, if the line frequency is 60 Hz, then peaks at multiples of this frequency are removed from the tabulated spectra, so as to not be confused with other, more important characteristics of the spectra.

The peaks in the peak tables for the test frequency spectrum and the reference frequency spectrum are then reduced in number by retaining a predetermined number of the largest peaks in each spectrum. Different criteria may be used to determine what "largest" means in this setting, but preferably it means those that have the greatest amplitude.

The largest peaks may be selected from the spectrum as a whole, or a predetermined number may be selected independently from each partition of the spectrum. For example, a total of from about fifty to about seventy-five peaks may be selected from the entire spectrum, or a total of from about fifteen to about twenty-five may be selected from each partition. It will again be appreciated that these numbers are given for convenience only, and a greater or lesser number of peaks may be selected. This is done in all cases independently for the test frequency spectrum and the reference frequency spectrum. In a most preferred embodiment, the same method of selecting the largest peaks is used on both of the spectra.

So that peaks of relatively greater amplitude are not given undue precedence over peaks of relatively lower amplitude during the process of comparing the test table to the reference table, the amplitude of the peaks of both spectra are independently normalized, meaning that the peaks of the test frequency spectrum are normalized as one group, and the peaks of the reference frequency spectrum are normalized as another group.

In a preferred embodiment the peaks are normalized to an integer value of from one to five. However, other values, such as from zero to one, could also be chosen. In a most preferred embodiment the normalizing process is commenced by locating the largest and the smallest peak in the spectrum, which are designated as PKHI and PKLO respectively. The designation of largest and smallest in this setting refers to absolute magnitude of amplitude, and not one of the other possible definitions of "largest" as described previously. The normalized value of each peak, designated as PKX, is calculated using the amplitude of the peak, designated as PKV, according to the equation:

$$PKX = 5 \times \frac{20 \times \log \frac{PKV}{PKLO}}{20 \times \log \frac{PKHI}{PKLO}} + 1$$

Thus, the step described above of partitioning, identifying peaks, removing line frequency peaks, identifying largest peaks, compiling a table of peaks, and normalizing the peaks is accomplished independently on the test frequency spectrum and the reference frequency spectrum. In other words, the characteristics of one of the spectra do not affect the above processes as applied to the other spectrum. Preferably, normalization of the tables is done for the whole table, but normalization could be conducted separately for each partition in the spectra.

An estimated low rotational speed, and an estimated high rotation speed are provided. The high and low rotational speeds could be manually estimated and entered by a technician performing the method of the invention, but in a preferred embodiment these speeds are calculated from at least the rated rotational speed of the shaft. For example, one may use the rated rotational speed, add and subtract five percent, and use those calculated speeds as high and low rotational speeds.

The specific method used is preferably based on the type of motor used to rotate the shaft. For further example, if the motor is an AC induction motor, the estimated high rotational speed could be calculated by finding the synchronous speed just above the rated speed of the motor. For a motor rated at 1750 rpm, and operating at 60 hertz, for example, the estimated high rotational speed would be 1800 rpm. The estimated low rotational speed could, in one embodiment, be determined by subtracting from the synchronous speed the difference between the rated speed and the synchronous speed, multiplied by a factor of, for example, 1.25. In the example given, this would yield a low estimated rotational speed of approximately 1725 rpm.

The high and low rotational speeds are used as a range in which to search for the unknown rotational speed corresponding to the test frequency spectrum. The estimated low rotational speed is divided by the known rotational speed, corresponding to the reference frequency spectrum, to produce a low stretch factor, and the estimated high rotational speed is divided by the known rotational speed of the reference spectrum to produce a high stretch factor. The high and low stretch factors represent a range, within which it is estimated that an optimum stretch factor exists, by which the test frequency spectrum peaks may be multiplied to achieve optimum correlation with the reference frequency spectrum peaks, and by which the known speed corresponding with the reference frequency spectrum may be divided to yield the unknown speed corresponding to the test frequency spectrum.

The range is found by subtracting the low stretch factor from the high stretch factor. This range is then divided by a predetermined number of steps to produce an increment. In a most preferred embodiment the predetermined number of steps changes as described in more detail below. The increments represent the incremental change in stretch factors that will be tested for producing optimum correlation between the test frequency spectrum peaks and the reference frequency spectrum peaks.

A set of stretch factors, including the low and the high stretch factors, and additional stretch factors between the low stretch factor and the high stretch factor, is compiled. Each of the additional stretch factors is determined by adding the product of the increment and a serialized number to the low stretch factor (this is the same as iteratively adding successive increments to the low stretch factor).

The serialized number is most preferably an integer ranging from one to the predetermined number of steps minus one. Thus, when the predetermined number of steps is, for example, 300, the first additional stretch factor after the low stretch factor would be determined by multiplying the increment by one, and adding that to the low stretch factor. The last additional stretch factor would be determined by multiplying the increment by 299, and adding that to the low stretch factor. Thus there would be a set of 301 stretch factors, representing evenly divided increments across the range.

Each of the stretch factors in the set of stretch factors is considered a trial stretch factor and is tested to determine if it provides optimum correlation between the test frequency spectrum peaks and the reference frequency spectrum peaks. This is done for each stretch factor in the set, one at a time, by multiplying the peak frequencies in the test table by the stretch factor to produce an adjusted test table of peaks. The adjusted table is compared to the reference table of peaks to produce a correlation index. The correlation index preferably has a greater value when the adjusted table is closer to the reference table.

In a most preferred embodiment, both the amplitude and frequency of the adjusted test table are compared with the amplitude and frequency of the reference table to produce the correlation index. To do this, the frequency resolutions of the test table and the reference table are determined. The smaller, or finer, of the two resolutions is multiplied by a factor, preferably about 0.7, and the resultant value is designated as DFRQ. Each peak of the test table is compared to the peaks of the reference table, to determine if there is a peak of the reference table which is within a frequency distance of DFRQ from the peak of the test table. If so, a match is said to occur between the two peaks, and if not, then no match occurs with the peak of the test table.

If a match occurs, then the positive difference in frequency between these two matching peaks is determined and designated as FDEL. The normalized amplitudes of the test table peaks are designated as PKXT, and the normalized amplitudes of the reference table peaks are designated as PKXR. The correlation index for the stretch factor is then calculated according to the equation:

$$\frac{\sum_{\text{Matches}}^{\text{All}} \left[ (PKX_T * PKX_R) \left( 1 - \frac{FDEL}{DFRQ} \right) \right]}{2.5 * \sum_{\text{Peaks}}^{\text{All}} PKX_T}$$

In an alternate embodiment, the correlation index for the stretch factor is calculated according to the equation:

$$\frac{\sum_{\text{Matches}}^{\text{All}} \left[ (PKX_T + PKX_R) \left( 1 - \frac{FDEL}{DFRQ} \right) \right]}{2.5 * \sum_{\text{Peaks}}^{\text{All}} (PKX_T + PKX_R)}$$

As previously mentioned, any correlation index which increases with degree of correlation between the peaks of the spectra is appropriate.

The correlation indexes produced by the stretch factors in the set are tabulated, and the largest correlation index is identified. As defined above, this largest correlation index corresponds to the stretch factor which produces the best correlation between the test frequency spectrum peaks and the reference frequency spectrum peaks, at least as to the current set of stretch factors.

This degree of correlation may not, however, be sufficient on which to base subsequent analysis of the rotating equipment, so in a preferred embodiment, the steps of multiplying the test table by stretch factors and determining a correlation index is iteratively repeated for a predetermined number of iterations. At the end of each iteration, except for the last, the set of stretch factors is adjusted, as described in more detail below.

That stretch factor in the set of stretch factors which is just less than the best stretch factor for the current iteration is selected to be the new low stretch factor for the next iteration, and the stretch factor in the set of stretch factors which is just greater than the best stretch factor for the current iteration is selected to be the new high stretch factor for the next iteration.

The steps of determining a range and producing an increment by dividing the range by a predetermined number of steps are repeated in a new iteration using the new values for the low stretch factor and the high stretch factor determined above. As mentioned above, the predetermined number of steps for these subsequent iterations may be the same or different from that used for the first iteration.

In a preferred embodiment, the predetermined number of steps used on the first iteration is larger than that on subsequent iterations, so as to more quickly focus in on the optimum stretch factor. However, in alternate embodiments, the predetermined number of steps for the first iteration may be the same as, or even less than the predetermined number of steps in the subsequent iterations.

This process of determining the stretch factor which produces the highest correlation index, and then adjusting the range for the set of stretch factors, is iteratively repeated, preferably for a given number of iterations, which is most preferably at least three in number. However, other end points could also be used, such as iteratively repeating the steps of the method until a correlation index greater than a specified value is obtained. On the last iteration the best stretch factor is designated as the optimum stretch factor.

The predetermined number of steps given herein, as has already been generally mentioned, is for convenience only, as it may be virtually any number greater than zero. As the number of steps decreases, more iterations may be required to determine an optimum stretch factor. As the number of steps increases, fewer iterations may be required to determine an optimum stretch factor. The method is made more efficient by having fewer total stretch factors calculated, as determined by adding the number of stretch factors calculated from all of the iterations. Thus, either having many steps in the initial iteration or fewer steps in each of several iterations, may be the optimum method to reduce the total number of stretch factors calculated. However, a large number of steps is preferably used in the initial iteration to ensure that the optimum stretch factor is bracketed.

Once the iterations are stopped, and the best, or largest, stretch factor from the final iteration has been selected as the optimum stretch factor, the unknown speed of the rotating shaft is calculated by dividing the known speed of the reference frequency spectrum by the optimum stretch factor. The flag, which indicates whether the rotation speed associated with the test frequency spectrum has been determined, and if so, how it has been determined, is preferably set to indicate that the speed was determined by calculation.

By using the iterative process of reducing and dividing the stretch factor range, the speed corresponding to the test spectrum is determined with greater precision. However, the accuracy of this speed measurement will not exceed the accuracy with which the speed corresponding to the reference spectrum 20 was measured. For this reason, it is preferred that the reference spectrum be associated with a rotational speed which has been very carefully measured with a high degree of accuracy. By so doing, it is only necessary to have the single reference spectrum, which can then subsequently be used time and again to accurately determine the speed of the rotor.

Once the unknown speed of the rotating shaft has been determined, the calculated rotational speed of the shaft can be used to help analyze the test frequency spectrum, and thereby the characteristics of the rotating shaft. For example, the speed of the shaft can be used with vibration information sensed from the shaft to locate problems such as unbalance, misalignment, and bearing damage. Once these problems have been diagnosed with the information, the technician can then correct the problems. Thus, the method of determining rotational speed as described is an important step in detecting, analyzing, and fixing problems with rotating equipment.

To aid in understanding the method, an example is now presented. Table 1 lists the amplitudes for twenty-five peaks of a reference frequency spectrum. In Table 2 the amplitudes have been normalized according to the method described above. Similarly, Table 3 lists the amplitudes for twenty-five peaks of a test frequency spectrum, and Table 4 lists the normalized amplitudes for the test frequency spectrum. In this example, four iterations will be used to determine the optimum correlation index. In the first iteration, the predetermined number of steps will be thirty-one, and for the three subsequent iterations the predetermined number of steps will be ten.

TABLE 1

| .239 | .013 | .002 | .002 | .090 |
|------|------|------|------|------|
| .012 | .002 | .002 | .028 | .006 |
| .002 | .002 | .012 | .005 | .002 |
| .002 | .015 | .012 | .003 | .152 |
| .003 | .002 | .010 | .002 | .002 |

TABLE 2

| 5.00 | 2.00 | 1.00 | 1.00 | 4.00 |
|------|------|------|------|------|
| 2.00 | 1.00 | 1.00 | 3.00 | 2.00 |
| 1.00 | 1.00 | 2.00 | 2.00 | 1.00 |
| 1.00 | 3.00 | 2.00 | 1.00 | 5.00 |
| 1.00 | 1.00 | 2.00 | 1.00 | 1.00 |

TABLE 3

| .095 | .025 | .004 | .007 | .274 |
|------|------|------|------|------|
| .004 | .004 | .003 | .021 | .003 |
| .003 | .002 | .036 | .004 | .004 |
| .006 | .057 | .003 | .005 | .470 |
| .005 | .004 | .020 | .003 | .022 |

TABLE 4

| 4.00 | 3.00 | 1.00 | 2.00 | 5.00 |
|------|------|------|------|------|
| 1.00 | 1.00 | 1.00 | 3.00 | 1.00 |
| 1.00 | 1.00 | 3.00 | 1.00 | 1.00 |
| 1.00 | 4.00 | 1.00 | 1.00 | 5.00 |
| 1.00 | 1.00 | 3.00 | 1.00 | 3.00 |

The estimated low speed is determined to be 29.5333 hertz, and the estimated high speed is determined to be 29.9950 hertz. The known speed of the reference frequency spectrum is 29.660 hertz, and so the low stretch factor for the first iteration is 0.988953, and the high stretch factor for the first iteration is 1.004926. The range is then 0.0160, making the increment about 0.0005. The set of stretch factors for the first iteration is given in Table 5, with their associated correlation indexes.

TABLE 5

| Stretch Factor | Correlation Index |
|----------------|-------------------|
| 0.988953 | 0.216475 |
| 0.989469 | 0.222851 |
| 0.989984 | 0.229227 |
| 0.990499 | 0.236216 |
| 0.991014 | 0.243969 |
| 0.991530 | 0.252387 |
| 0.992045 | 0.262099 |
| 0.992560 | 0.272146 |
| 0.993075 | 0.282194 |
| 0.993591 | 0.292241 |
| 0.994106 | 0.302289 |
| 0.994621 | 0.312336 |
| 0.995136 | 0.322383 |
| 0.995652 | 0.330850 |
| 0.996167 | 0.338958 |
| 0.996682 | 0.346030 |
| 0.997197 | 0.352289 |
| 0.997713 | 0.358547 |
| 0.998228 | 0.364806 |
| 0.998743 | 0.370514 |
| 0.999258 | 0.374815 |
| 0.999774 | 0.379116 |
| 1.000289 | 0.373227 |
| 1.000804 | 0.364888 |
| 1.001319 | 0.356613 |
| 1.001835 | 0.349588 |
| 1.002350 | 0.342844 |
| 1.002865 | 0.336101 |
| 1.003380 | 0.329357 |
| 1.003896 | 0.323072 |
| 1.004411 | 0.317412 |
| 1.004926 | 0.311751 |

As can be seen in Table 5, the largest correlation index, 0.379116, corresponds to the stretch factor of 0.999774. The stretch factor just less than this is 0.999258, which becomes the new low stretch factor for the next iteration, and the stretch factor just greater than this is 1.000289, which becomes the new high stretch factor for the next iteration. The set of stretch factors for this second iteration, and their associated correlation indexes, is given in Table 6.

TABLE 6

| Stretch Factor | Correlation Index |
|----------------|-------------------|
| 0.999258 | 0.374815 |
| 0.999361 | 0.375675 |
| 0.999465 | 0.376536 |
| 0.999568 | 0.377395 |
| 0.999671 | 0.378256 |
| 0.999774 | 0.379116 |
| 0.999877 | 0.379899 |
| 0.999980 | 0.378231 |
| 1.000083 | 0.376563 |
| 1.000186 | 0.374895 |
| 1.000289 | 0.373227 |

The largest correlation index in Table 6 is 0.379899, corresponding to a stretch factor of 0.999877. The stretch factors just less than and greater than this are again made the new low and high stretch factors for the subsequent iteration, for which the stretch factors and associated correlation indexes are listed in Table 7. The largest correlation index in Table 7 has the same value, and is associated with the same stretch factor, as that in Table 6. By this it might erroneously be presumed that a more optimal stretch factor could not be found.

TABLE 7

| Stretch Factor | Correlation Index |
|---|---|
| 0999774 | 0.379116 |
| 0.999794 | 0.379287 |
| 0.999815 | 0.379460 |
| 0.999836 | 0.379632 |
| 0.999856 | 0.379804 |
| 0.999877 | 0.379899 |
| 0.999897 | 0.379566 |
| 0.999918 | 0.379232 |
| 0.999939 | 0.378898 |
| 0.999959 | 0.378565 |
| 0.999980 | 0.378231 |

However, by continuing the iterative process one final time, it is seen that the largest correlation index of Table 6 and Table 7 is not the largest correlation index possible. By further increasing the resolution of the stretch factor, or in other words decreasing the size of the increment, it can be seen that the largest correlation index in Table 8, which contains the information for the fourth iteration, is 0.379942, which is associated with a stretch factor of 0.999873. It is possible to further refine the stretch factor by performing additional iterations, but the present example is sufficient for explaining the method.

TABLE 8

| Stretch Factor | Correlation Index |
|---|---|
| 0.999856 | 0.379804 |
| 0.999860 | 0.379838 |
| 0.999864 | 0.379872 |
| 0.999868 | 0.379907 |
| 0.999873 | 0.379942 |
| 0.999877 | 0.379899 |
| 0.999881 | 0.379833 |
| 0.999885 | 0.379766 |
| 0.999889 | 0.379699 |
| 0.999893 | 0.379633 |
| 0.999897 | 0.379566 |

The optimum stretch factor of 0.999873 is used to determine the unknown speed associated with the test frequency spectrum by dividing it into the known speed associated with the reference frequency spectrum. When this is done, a rotational speed of 29.6638 hertz is calculated for the unknown speed. This rotational speed may then be used to further analyze and adjust the rotating equipment.

While preferred embodiments of the present invention are described above, it will be appreciated by those of ordinary skill in the art that the invention is capable of numerous modifications, rearrangements and substitutions without departing from the spirit of the invention.

What is claimed is:

1. A method of determining the rotational speed of a rotating shaft, comprising:

sensing vibration produced by the shaft to produce a test vibration signal at an unknown rotational speed of the shaft, converting the test vibration signal to a test frequency spectrum, compiling a table of peaks found in the test frequency spectrum, providing a reference frequency spectrum corresponding to a known rotational speed of the shaft, compiling a table of peaks found in the reference frequency spectrum, and determining a stretch factor that provides optimum correlation between the table of test frequency spectrum peaks and the table of reference frequency spectrum peaks, and calculating the unknown rotational speed of the rotating shaft using the known rotational speed of the reference frequency spectrum and the stretch factor.

2. The method of claim 1 further comprising removing from the table of peaks of the test frequency spectrum, prior to determining the stretch factor, peaks corresponding to line frequency and multiples of the line frequency.

3. The method of claim 1 further comprising:

the table of test frequency spectrum peaks having peak frequency and peak amplitude information from the test frequency spectrum, and the table of reference frequency spectrum peaks having peak frequency and peak amplitude information from the reference frequency spectrum.

4. The method of claim 1 wherein the step of determining the stretch factor further comprises:

partitioning the test frequency spectrum into a predetermined number of partitions;

independently identifying peaks in each partition of the test frequency spectrum, partitioning the reference frequency spectrum into a predetermined number of partitions;

independently identifying peaks in each partition of the reference frequency spectrum, determining the stretch factor that provides optimum correlation between the identified test frequency spectrum peaks and the identified reference frequency spectrum peaks.

5. The method of claim 4 wherein the predetermined number of test frequency spectrum partitions is equal to the predetermined number of reference frequency spectrum partitions.

6. The method of claim 4 wherein the test frequency spectrum partitions are all the same size.

7. The method of claim 6 wherein the reference frequency spectrum partitions are all the same size.

8. The method of claim 1 wherein the step of determining the stretch factor further comprises:

determining peak amplitudes for the test frequency spectrum peaks, normalizing the peak amplitudes of the test frequency spectrum peaks to produce normalized peaks, determining peak amplitudes for the reference frequency spectrum peaks, normalizing the peak amplitudes of the test frequency spectrum peaks to produce normalized peaks, and determining the stretch factor that provides optimum correlation between the normalized test frequency spectrum peaks and the normalized reference frequency spectrum peaks.

9. The method of claim 8 wherein the step of normalizing the peak amplitudes of the test frequency spectrum peaks further comprises:

locating a largest peak in the test frequency spectrum table of peaks, designated as PKHI, locating a smallest peak in the test frequency spectrum table of peaks, designated as PKLO, calculating normalized values of test frequency spectrum peaks, designated as PKX, using the peak amplitudes of the test frequency spectrum peaks, designated as PKV, according to the equation:

$$PKX = 5 \times \frac{20 \times \log \frac{PKV}{PKLO}}{20 \times \log \frac{PKHI}{PKLO}} + 1$$

10. The method of claim 1 wherein the step of determining a stretch factor comprises:
   providing a trial stretch factor,
   iteratively repeating the following steps;
      multiplying the test frequency spectrum peaks by the trial stretch factor,
      determining a correlation index between the reference frequency spectrum peaks and the test frequency spectrum peaks as multiplied by the trial stretch factor,
      if it is not the final iteration, then adjusting the trial stretch factor,
   stopping the iteration after a predetermined number of iterations,
   identifying a largest correlation index, and
   designating the trial stretch factor that produced the largest correlation index as the optimum stretch factor.

11. The method of claim 1 wherein the step of determining a stretch factor comprises:
   selecting a trial stretch factor,
   iteratively repeating the following steps;
      producing a set of trial stretch factors based on the selected trial stretch factor,
      independently multiplying the test frequency spectrum peaks by each of the trial stretch factors in the set,
      determining correlation indexes between the reference frequency spectrum peaks and the test frequency spectrum peaks as multiplied by the trial stretch factors in the set,
      identifying a largest correlation index,
      selecting a trial stretch factor in the set which produces the largest correlation index between the reference frequency spectrum peaks and the test frequency spectrum peaks,
   stopping the iteration after a predetermined number of iterations, and
   designating the selected trial stretch factor as an optimum stretch factor.

12. The method of claim 1 further comprising:
   providing a flag which indicates whether the rotational speed of the shaft has already been determined, and if the flag indicates that the rotational speed of the shaft has already been determined, then the flag also indicates how the rotational speed of the shaft was determined, and
   selectively by-passing all other steps of the method based on the flag.

13. The method of claim 12 wherein the flag further indicates whether the rotational speed of the shaft was determined by a specific one of a plurality of methods selected from the group consisting of calculated from a test spectrum table of peaks, measured, and manually set.

14. The method of claim 12 wherein the step of selectively by-passing further comprises selectively performing all other steps of the method regardless of the flag.

15. The method of claim 1 further comprising:
   providing a flag which indicates whether the rotational speed of the shaft has already been determined, and if the flag indicates that the rotational speed of the shaft has already been determined, then the flag also indicates how the rotational speed of the shaft was determined,
   selectively by-passing all other steps of the method based on the flag,
   the step of determining the stretch factor further comprising;
      partitioning the test frequency spectrum into a predetermined number of partitions;
      independently identifying peaks having frequency and amplitude in each partition of the test frequency spectrum,
      normalizing the amplitude of the peaks of the test frequency spectrum,
      compiling a table of frequencies and amplitudes for a predetermined number of largest peaks identified in each partition of the test frequency spectrum,
      partitioning the reference frequency spectrum into a predetermined number of partitions;
      independently identifying peaks having frequency and amplitude in each partition of the reference frequency spectrum,
      normalizing the amplitude of the peaks of the test frequency spectrum,
      compiling a table of frequencies and amplitudes for a predetermined number of largest peaks identified in each partition of the test frequency spectrum,
      providing the stretch factor,
   iteratively repeating the following steps;
      multiplying the test frequency spectrum peaks by the stretch factor,
      determining a correlation index between the reference frequency spectrum peaks and the test frequency spectrum peaks as multiplied by the stretch factor,
      adjusting the stretch factor unless it is the final iteration, and
   stopping the iteration after a predetermined number of iterations.

16. The method of claim 15 wherein the predetermined number of test frequency spectrum partitions is equal to the predetermined number of reference frequency spectrum partitions.

17. The method of claim 15 wherein the test frequency spectrum partitions are all the same size.

18. The method of claim 15 wherein the reference frequency spectrum partitions are all the same size.

19. The method of claim 15 wherein the step of normalizing the amplitude of the peaks of the test frequency spectrum further comprises;
   locating a largest peak in the test frequency spectrum table of peaks, designated as PKHI,
   locating a smallest peak in the test frequency spectrum table of peaks, designated as PKLO,
   calculating a normalized value of each peak in the test frequency spectrum, designated as PKX, using the amplitude of the peak, designated as PKV, according to the equation:

$$PKX = 5 \times \frac{20 \times \log \frac{PKV}{PKLO}}{20 \times \log \frac{PKHI}{PKLO}} + 1$$

20. The method of claim 15 wherein the flag further indicates whether the rotational speed of the shaft was determined by a specific one of a plurality of methods selected from the group consisting of calculated, measured, and manually set.

21. The method of claim 15 wherein the step of selectively by-passing further comprises selectively performing all steps of the method regardless of the flag.

22. The method of claim 15 wherein the step of determining a correlation index further comprises:

determining a smaller of a frequency resolution of the test frequency spectrum and a frequency resolution of the reference frequency spectrum, multiplied by a factor and designated as DFRQ, determining a positive difference in frequency, designated as FDEL, between each peak of the test frequency spectrum which can be matched to one of the peaks of the reference frequency spectrum which is at most a frequency distance of DFRQ away, designating the normalized amplitudes of the test frequency spectrum peaks as $PKX_T$, designating the normalized amplitudes of the reference frequency spectrum peaks as $PKX_R$, and calculating the correlation index according to the equation:

$$\frac{\sum\limits_{\text{Matches}}^{\text{All}} \left[ (PKX_T * PKX_R) \left( 1 - \frac{FDEL}{DFRQ} \right) \right]}{2.5 * \sum\limits_{\text{Peaks}}^{\text{All}} PKX_T}$$

23. A method of determining the rotational speed of a rotating shaft, comprising:

a. sensing vibration produced by the shaft to produce a test vibration signal at an unknown rotational speed of the shaft, b. converting the test vibration signal to a test frequency spectrum, c. providing a reference frequency spectrum corresponding to a known rotational speed of the shaft, d. partitioning the reference frequency spectrum into a predetermined number of partitions, e. independently identifying reference frequency spectrum peaks having frequency and amplitude in each partition of the reference frequency spectrum, f. removing reference frequency spectrum peaks corresponding to line frequency in the reference frequency spectrum, g. independently identifying a predetermined number of largest reference frequency spectrum peaks in each partition of the reference frequency spectrum, h. compiling a table of frequencies and amplitudes for the largest reference frequency spectrum peaks identified from each partition of the reference frequency spectrum, i. normalizing the amplitude of the reference frequency spectrum peaks, j. partitioning the test frequency spectrum into a predetermined number of partitions, k. independently identifying test frequency spectrum peaks having frequency and amplitude in each partition of the test frequency spectrum, l. removing test frequency spectrum peaks corresponding to line frequency in the test frequency spectrum, m. independently identifying a predetermined number of largest test frequency spectrum peaks from each partition of the test frequency spectrum, n. compiling a table of frequencies and amplitudes for the largest test frequency spectrum peaks identified in each partition of the test frequency spectrum, o. normalizing the amplitude of the test frequency spectrum peaks, p. providing an estimated low unknown rotational speed, q. providing an estimated high unknown rotational speed, r. dividing the estimated low unknown rotational speed by the known rotational speed to produce a low stretch factor, s. dividing the estimated high unknown rotational speed by the known rotational speed to produce a high stretch factor, t. subtracting the low stretch factor from the high stretch factor to produce a range, u. dividing the range by a predetermined number of steps to produce an increment, v. compiling a set of stretch factors including the low stretch factor and the high stretch factor, and additional stretch factors between the low stretch factor and the high stretch factor, where each of the additional stretch factors is determined by adding to the low stretch factor a product of the increment and a serialized number, where the serialized number is an integer ranging from 1 to the predetermined number of steps minus 1, w. selecting a selected stretch factor from the set of stretch factors until all stretch factors in the set of stretch factors have been selected, and for each selected stretch factor in the set of stretch factors;

1. multiplying the test frequency spectrum peaks by the selected stretch factor in the set of stretch factors to produce adjusted peaks, 2. comparing the adjusted peaks to the reference frequency spectrum peaks to produce a correlation index, where the correlation index has a greater value when the adjusted peaks are closer to the reference frequency spectrum peaks, x. selecting a first stretch factor from the set of stretch factors which yields a largest correlation index as a best stretch factor, y. selecting a second stretch factor from the set of stretch factors which is just less than the best stretch factor to be the low stretch factor, z. selecting a stretch factor which is just greater than the best stretch factor to be the high stretch factor, aa. iteratively repeating steps t through z for a predetermined number of iterations, and bb. calculating the unknown speed of the rotating shaft by dividing the known rotational speed of the shaft corresponding to the reference frequency spectrum by the best stretch factor produced by the last repetition of steps t through z, which is designated as an optimum stretch factor.

24. The method of claim 23 further comprising analyzing the test frequency spectrum using, in part, the calculated unknown rotational speed.

25. The method of claim 23 wherein the predetermined number of test frequency spectrum partitions is equal to the predetermined number of reference frequency spectrum partitions.

26. The method of claim 23 wherein the rotating shaft is driven by a motor characterized by a motor type and the estimated high and low unknown rotational speeds are provided based at least on the motor type of the motor driving the rotating shaft.

27. The method of claim 23 wherein the test frequency spectrum partitions are all the same size.

28. The method of claim 23 wherein the reference frequency spectrum partitions are all the same size.

29. The method of claim 23 wherein the step of normalizing the amplitude of the test frequency spectrum peaks further comprises;
locating a largest peak in the test frequency spectrum table of peaks, designated as PKHI,
locating a smallest peak in the test frequency spectrum table of peaks, designated as PKLO,
calculating a normalized value of each of the test frequency spectrum peaks, designated as PKX, using the amplitude of the peak, designated as PKV, according to the equation:

$$PKX = 5 \times \frac{20 \times \log \frac{PKV}{PKLO}}{20 \times \log \frac{PKHI}{PKLO}} + 1$$

30. The method of claim 23 further comprising:
providing a flag which indicates whether the rotational speed of the shaft has already been determined, and if the flag indicates that the rotational speed of the shaft has already been determined, then the flag also indicates how the rotational speed of the shaft was determined, and
selectively by-passing all other steps of the method based on the flag.

31. The method of claim 30 wherein the flag further indicates whether the rotational speed of the shaft was determined by a specific one of a plurality of methods selected from the group consisting of calculated, measured, and manually set.

32. The method of claim 30 wherein the step of selectively by-passing further comprises selectively performing all other steps of the method regardless of the flag.

33. The method of claim 23 wherein the step of comparing to produce a correlation index further comprises:
determining a smaller of a frequency resolution of the test frequency spectrum and a frequency resolution of the reference frequency spectrum, multiplied by a factor and designated as DFRQ,
determining a positive difference in frequency, designated as FDEL, between each one of the test frequency spectrum peaks of the test frequency spectrum table of peaks which can be matched to one of the reference frequency spectrum peaks of the reference frequency spectrum table of peaks which is at most a frequency distance of DFRQ away,
designating the normalized amplitudes of the test frequency spectrum peaks as $PKX_T$,
designating the normalized amplitudes of the reference frequency spectrum peaks as $PKX_R$, and
calculating the correlation index according to the equation:

$$\frac{\sum\limits_{\text{Matches}}^{\text{All}} \left[ (PKX_T * PKX_R)\left(1 - \frac{FDEL}{DFRQ}\right) \right]}{2.5 * \sum\limits_{\text{Peaks}}^{\text{All}} PKX_T}$$

34. The method of claim 23 wherein the estimated low unknown rotational speed and the estimated high unknown rotational speed are manually provided.

35. The method of claim 23 wherein the estimated low unknown rotational speed and the estimated high unknown rotational speed are calculated based on at least a rated rotational speed of the shaft.

36. The method of claim 23 wherein the predetermined number of steps is different for the first iteration than for all subsequent iterations.

37. The method of claim 23 wherein the predetermined number of steps is the same for all iterations.

* * * * *